UNITED STATES PATENT OFFICE.

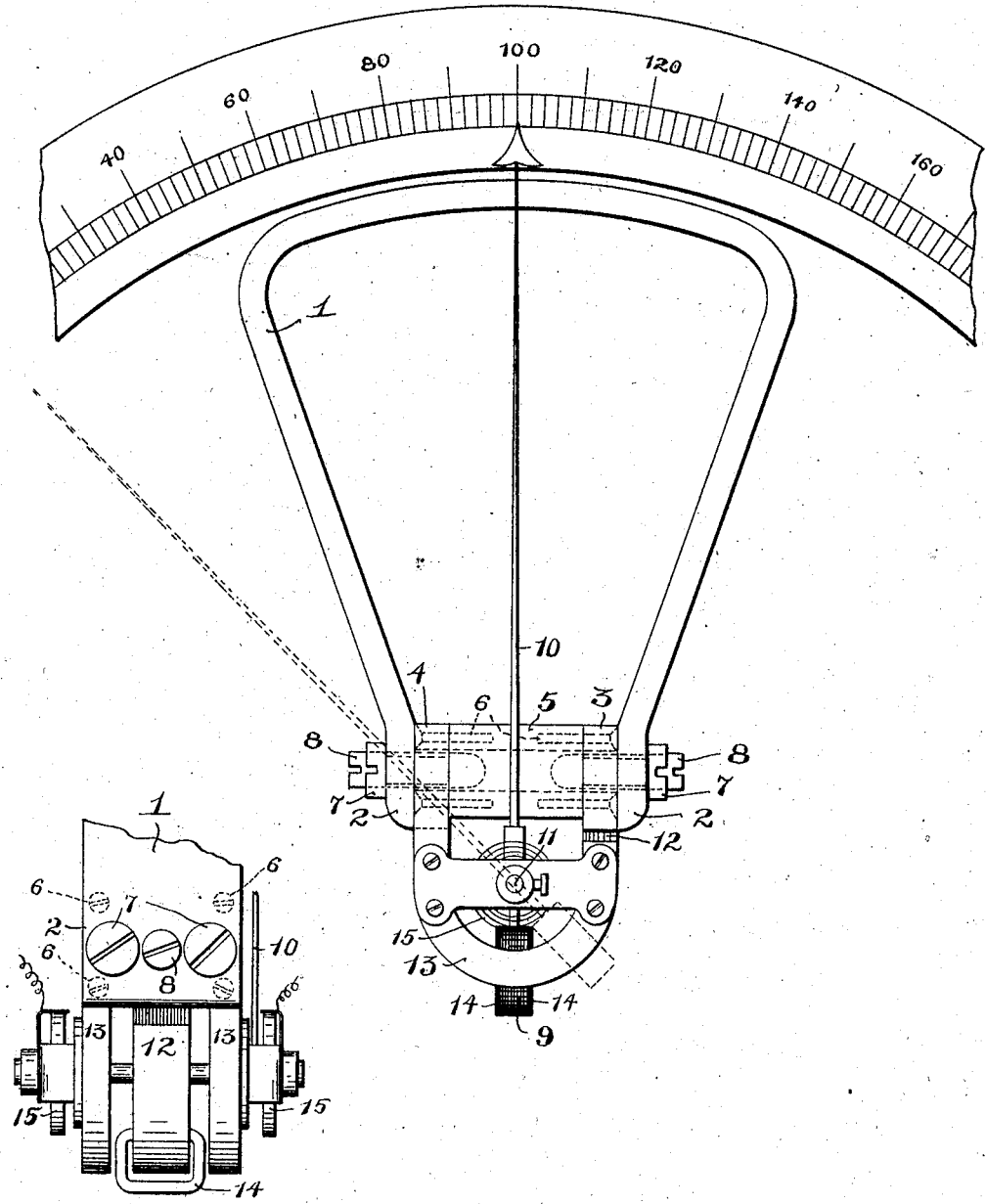

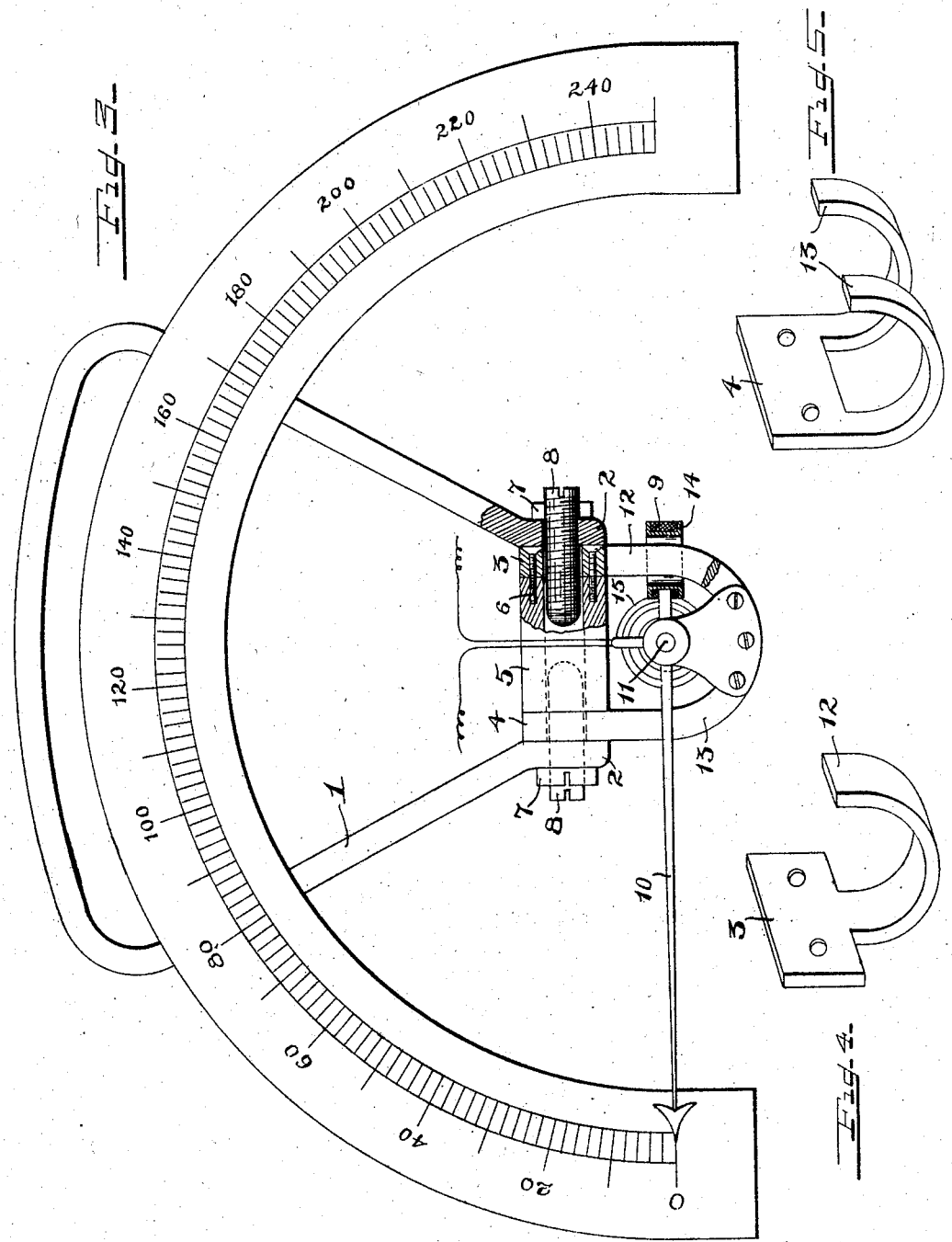

THOMAS DUNCAN, OF LAFAYETTE, INDIANA, ASSIGNOR TO DUNCAN ELECTRIC MANUFACTURING COMPANY, OF LAFAYETTE, INDIANA.

INDICATING INSTRUMENT.

No. 796,061.            Specification of Letters Patent.            Patented Aug. 1, 1905.

Application filed January 8, 1902. Renewed January 7, 1905. Serial No. 239,980.

*To all whom it may concern:*

Be it known that I, THOMAS DUNCAN, a citizen of the United States, residing at Lafayette, in the county of Tippecanoe and State of Indiana, have invented a certain new and useful Improvement in Indicating Instruments, of which the following is a full, clear, concise, and exact description, reference being had to the accompanying drawings, forming a part of this specification.

My invention relates to indicating instruments, and has for its object, first, the provision of means whereby the field when due to permanent magnets may be adjusted from time to time to maintain a uniform flux in the motor element of the meter to overcome derangement in the permanent magnet, the permanent magnet frequently becoming weakened through rough usage; second, the provision of an instrument whose index or pointer may have a wide range of movement and whose reading-scale may be provided with division or scale marks uniformly separated; third, the provision of simplified means whereby the instrument may be rendered dead-beat.

To accomplish the first object of my invention, I employ a permanent magnet that supplies magnetic flux to a magnetic circuit, the motor element of the meter being located in a portion of this magnetic circuit, a path of adjustable reluctance separating this portion of the magnetic circuit from the balance. The portion of the magnetic circuit that is directly associated with the motor element of the meter, and which may be said, in fact, to constitute a part of the motor element, is preferably composed of soft-iron pole-pieces secured to the poles of a permanent magnet, these soft-iron pole-pieces being preferably semicircular. In order to provide the path of adjustable magnetic reluctance, iron screws are passed through the poles of the permanent magnet and the soft-iron polar extensions, which screws being movable transversely of the pole-pieces serve to lengthen or shorten the magnetic gap between the same. When the instrument is new, these iron screws are moved inwardly to provide two magnetic circuits, one including the permanent magnet and the said screws, the other the said permanent magnet and the soft-iron polar extensions. As the permanent magnet deteriorates the reluctance-adjusting screws are withdrawn sufficiently to restore the proper degree of magnetic flux threading the polar extensions.

In accomplishing the second object of my invention I provide a meter-winding that is bodily movable with the index or pointer of the instrument, the meter-winding being placed upon one side of the index-pivot, this meter-winding traveling in a magnetic field of substantially uniform strength, whereby the torque of the instrument is maintained uniform throughout the varying angular positions of the needle.

I accomplish the third object of my invention by providing the winding of the meter with a body of material, preferably aluminium, which by moving in the magnetic field has eddy-currents set up therein, whereby the motion of the needle is retarded to make the instrument dead-beat.

I will explain my invention more fully by reference to the accompanying drawings, in which—

Figure 1 is a front elevation of a meter whose index-needle or pointer is adapted for one range of movement; Fig. 2, a side elevation of a part of the motor mechanism thereof; Fig. 3, a view in elevation of an instrument having a wider range of operation, the central portion of the instrument being shown in section; and Figs. 4 and 5, soft-iron pole extensions, preferably entering into the construction of the meter.

Like parts are indicated by similar characters of reference throughout the different views.

The permanent magnet 1 may be of any suitable shape, that illustrated being preferred. The polar ends 2 2 of this magnet preferably extend parallel to each other, to which polar ends are secured the soft-iron polar extensions 3 4. To secure these polar extensions in place, I prefer to employ a distance-piece of non-magnetic material, preferably a tube of brass 5, screws 6, preferably of brass, uniting the polar extensions and the said distance-piece directly together. The polar extensions thus assembled are secured to the polar ends of the permanent magnet by means of screws 7, preferably of iron. The distance-piece 5 is preferably provided with axially-placed recesses, within which the screws 8, composed, preferably, of soft-iron, are adapted to project, these screws 8 having threaded engagement with the poles of the permanent magnet or their polar extensions. The winding 9 of the meter is preferably placed and mounted as illustrated, being carried upon one end of an index-needle 10, the pivot 11 of the needle being located between the indicating end thereof and the said winding, the pivot being located near the winding. The winding is thus movable in the arc of a circle. It preferably encompasses a tongue 12 of the polar extension 3 and is preferably interposed between the tongues 13 of the extension 4, the tongue 12 being also interposed between the tongues 13. These tongues are preferably semicircular if the indicating element is to have a wide range of movement, or the tongues may have other suitable shape and be so disposed with relation to the pivot of the needle as to secure for the needle the desired range of operation. The soft-iron pole-pieces by thus elongating or intermeshing serve to complete a path for the lines of force threading the permanent magnet.

In the initial adjustment of the instrument when it is new, the permanent magnet being then at its best, the screws 8 are thrust inwardly, reducing the magnetic flux following the soft-iron polar extensions sufficiently to have the meter operate properly. As the magnetism of the permanent magnet is lessened, which frequently happens on account of rough usage, the screws or bolts 8 are withdrawn to produce a sufficient increase in the reluctance of the path shunting the soft-iron pole-pieces to divert more lines of force through these poles-pieces, and thereby restore the strength of the magnetic field to which the meter-winding 9 is subject. The magnetic strength of the polar extensions is substantially uniform throughout, so that the meter-winding 9 may be moved in even gradations to cause the needle to indicate upon a uniformly-graded scale the units the meter is to measure.

To cause the needle 10 to be dead-beat, I preferably provide the winding 9 with damping-rings 14, (or, if preferred, the said winding may be provided upon a spool composed of aluminium,) which by being subject to the magnetic field furnished by the polar extensions acts to prevent a too sudden response of the meter-winding to variations in the load conditions.

The tongues 12 and 13 are curved, the centers of the curves being coincident with the pivot 11.

It will be observed that the soft-iron polar extensions and the screws 8 form parallel paths for magnetic lines of force due to the permanent magnet.

The index-needle and the meter-winding carried thereby may be provided with checking-springs 15, arranged in the well-known manner, to carry current to the winding 9 and exert a pull counter to that furnished by the said winding in coöperation with the soft-iron polar extensions.

While I have herein shown and particularly described the preferred embodiment of my invention, it is obvious that changes may be made without departing from the spirit thereof, and I do not wish, therefore, to be limited to the precise embodiment of the invention herein disclosed; but,

Having thus described my invention, I claim as new and desire to secure by Letters Patent—

1. In a meter, the combination with a permanent magnet of separately-formed polar extensions thereof, of a meter-winding subject to the influence of the said polar extensions, and a non-magnetic distance-piece between the poles of the magnet, the said distance-piece being tubular, and a magnetic shunt device in the form of a magnetizable bolt disposed near the poles of the magnet and passing into the bore of the distance-piece, substantially as described.

2. In a meter, the combination with a permanent magnet provided with two separately-formed polar extensions, of a tubular distance-piece of non-magnetic material interposed between the polar extensions, a magnetizable bolt constituting part of a magnetic shunt about the pole-pieces and projecting within the bore of the distance-piece, and a meter-winding subject to the said polar extensions, substantially as described.

3. In a meter, the combination with a permanent magnet provided with two separately-formed polar extensions, of a tubular distance-piece of non-magnetic material interposed between the polar extensions and magnetizable bolts passing into the bore of the distance-piece, substantially as described.

4. In a meter, the combination with a permanent magnet provided with two separately-formed polar extensions, of a tubular distance-piece of non-magnetic material interposed between the polar extensions, a magnetizable bolt adjustably mounted, constituting part of a magnetic shunt about the pole-pieces and projecting within the bore of the distance-piece, and a meter-winding subject to the said polar extensions, substantially as described.

5. In a meter, the combination with a permanent magnet provided with two separately-formed polar extensions, a tubular distance-piece of non-magnetic material interposed between the polar extensions and magnetizable bolts adjustably mounted, passing into the bore of the distance-piece, substantially as described.

In witness whereof I hereunto subscribe my name this 16th day of August, A. D. 1901.

THOMAS DUNCAN.

Witnesses:
GEORGE L. GRAGG,
HERBERT F. OBERGFELL.